(12) United States Patent
Inoue

(10) Patent No.: US 9,586,664 B2
(45) Date of Patent: Mar. 7, 2017

(54) VESSEL PROPULSION SYSTEM

(71) Applicant: YAMAHA HATSUDOKI KABUSHIKI KAISHA, Iwata-shi, Shizuoka (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 128 days.

(21) Appl. No.: 13/928,457

(22) Filed: Jun. 27, 2013

(65) Prior Publication Data

US 2014/0012440 A1    Jan. 9, 2014

(30) Foreign Application Priority Data

Jul. 4, 2012 (JP) ................................. 2012-150727

(51) Int. Cl.
  *B63H 20/00*   (2006.01)
  *F02D 31/00*   (2006.01)
  *F02P 5/15*    (2006.01)

(52) U.S. Cl.
  CPC ........... *B63H 20/007* (2013.01); *B63H 20/00* (2013.01); *F02D 31/002* (2013.01); *F02P 5/1502* (2013.01); *Y02T 10/46* (2013.01)

(58) Field of Classification Search
  None
  See application file for complete search history.

(56) References Cited

U.S. PATENT DOCUMENTS

| | | | | | |
|---|---|---|---|---|---|
| 5,582,149 | A | * | 12/1996 | Kanno | F02P 5/02 123/406.74 |
| 5,586,535 | A | * | 12/1996 | Syomura | 123/352 |
| 6,015,319 | A | * | 1/2000 | Tanaka | 440/84 |
| 6,079,389 | A | * | 6/2000 | Ono et al. | 123/352 |
| 2002/0010541 | A1 | * | 1/2002 | Houston | F02D 37/02 701/115 |
| 2002/0177940 | A1 | | 11/2002 | Suzuki et al. | |
| 2007/0082565 | A1 | * | 4/2007 | Okuyama | 440/1 |
| 2009/0287394 | A1 | * | 11/2009 | Ishida et al. | 701/103 |

FOREIGN PATENT DOCUMENTS

JP          6-80306 B2    10/1994

\* cited by examiner

*Primary Examiner* — Thomas Tarcza
*Assistant Examiner* — Garrett Evans
(74) *Attorney, Agent, or Firm* — Keating and Bennett, LLP

(57) ABSTRACT

A vessel propulsion system includes an engine that provides a propulsive force to a vessel, a throttle valve to adjust an air amount supplied to the engine, an accelerator operation unit operated by an operator to adjust a throttle opening degree, the throttle opening degree corresponding to an operation amount of the accelerator operation unit, and a control unit programmed to vary an engine output even when the throttle opening degree is maintained at a fixed value other than an idling opening degree, the engine output corresponding to the operation amount of the accelerator operation unit as a reference output.

11 Claims, 8 Drawing Sheets

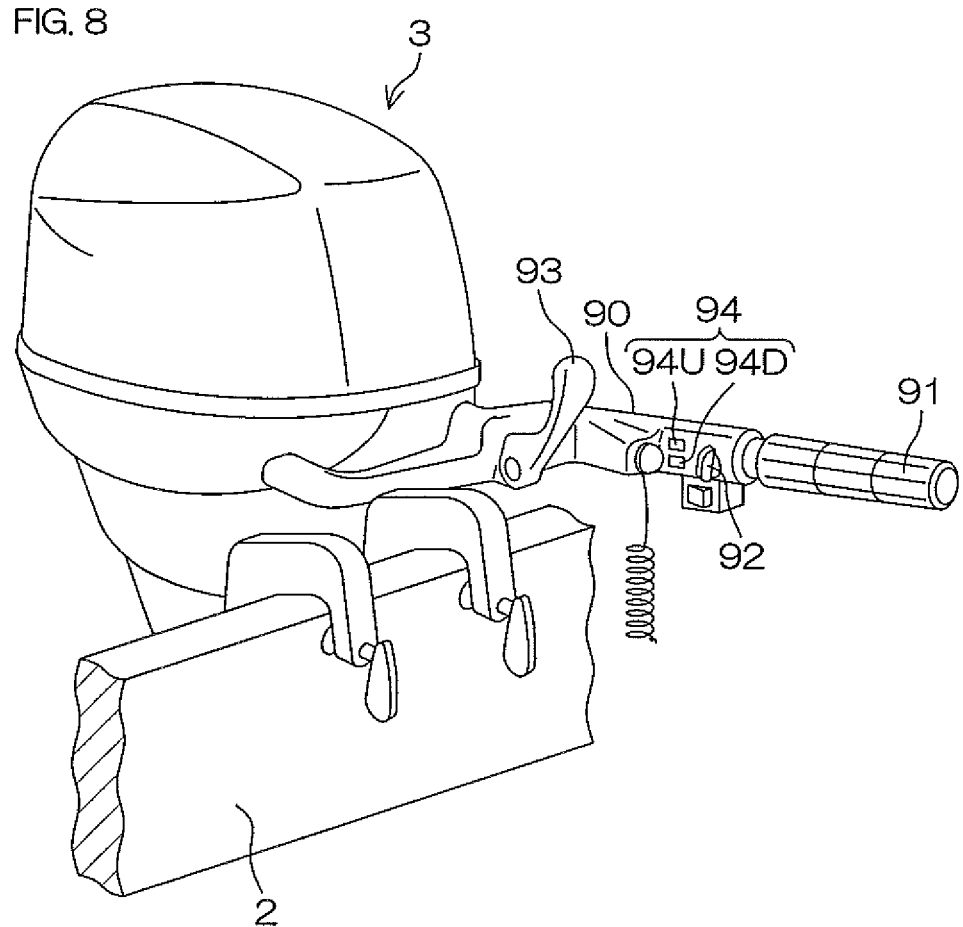

VESSEL PROPULSION SYSTEM

BACKGROUND OF THE INVENTION

1. Field of the Invention

The present invention relates to a vessel propulsion system using an engine, preferably an internal combustion engine, as a propulsive force generation source.

2. Description of the Related Art

United States Patent Application Publication No. US 2002/0177940 A1 discloses an outboard motor with which a propulsion unit is driven by an internal combustion engine. A throttle valve is disposed in an air intake passage of the internal combustion engine. Also, a bypass passage introduces air from the atmosphere into an air intake passage further downstream of the throttle valve. An opening/closing valve that can be adjusted in its opening degree is interposed in the bypass passage. During starting of the internal combustion engine, the opening degree (bypass opening degree) of the opening/closing valve is controlled according to an engine temperature and after completion of warm-up of the engine, the bypass opening degree is controlled to attain a predetermined idling engine speed. To obtain a desired trolling propulsion state, a portable terminal is connected to the control unit and arrangements are made to enable a larger value or a smaller value than the idling engine speed to be set as a target engine speed. The desired trolling propulsion state can thereby be obtained by increasing/decreasing the target engine speed in a stepwise manner based on the idling engine speed.

SUMMARY OF THE INVENTION

The inventor of preferred embodiments of the present invention described and claimed in the present application conducted an extensive study and research regarding vessel propulsion systems, such as the one described above, and in doing so, discovered and first recognized new unique challenges and previously unrecognized possibilities for improvements as described in greater detail below.

With the prior art described above, the target engine speed in the trolling propulsion state is merely increased/decreased between an upper limit value and a lower limit value based on the idling engine speed. A propulsive force that is obtained in the trolling propulsion state is thus small and merely enables a vessel to undergo constant speed travel at a low speed or the vessel to be maintained at a fixed position against a tidal current. However, there are cases where constant speed travel at a higher speed is desired and the trolling propulsion function provided by the prior art is not necessarily effective or satisfactory.

In order to overcome the previously unrecognized and unsolved challenges described above, a preferred embodiment of the present invention provides a vessel propulsion system including an engine as a generation source of a propulsive force applied to a vessel, a throttle valve that adjusts an air amount supplied to the engine, an accelerator operation unit operated by an operator to adjust a throttle opening degree, the throttle opening degree corresponding to an operation amount of the accelerator operation unit, and a control unit programmed to vary an engine output even when the throttle opening degree is maintained at a fixed value other than an idling opening degree, the engine output corresponding to the operation amount of the accelerator operation unit as a reference output.

With the above-described arrangement, the throttle opening degree is determined in accordance with the operation amount of the accelerator operation unit, and when the throttle opening degree is maintained at a fixed value other than the idling opening degree, the engine output can be varied by the control unit. That is, when the throttle opening degree is maintained at the fixed value other than the idling opening degree by maintaining a fixed operation amount of the accelerator operation unit, the engine output can be varied based on the engine output corresponding to the throttle opening degree. Thus, the engine output can be varied, for example, in a higher speed range outside an idling engine speed range without dependence on operation of the accelerator operation unit.

A vessel propulsion system according to a preferred embodiment of the present invention further includes an output operation unit operated by the operator to adjust the engine output. The control unit varies the engine output in accordance with an operation of the output operation unit. With the above-described arrangement, when the throttle opening degree is maintained at a fixed value other than the idling opening degree by maintaining the fixed operation amount of the accelerator operation unit, the engine output can be varied by operating the output operation unit. Thus, the vessel can be propelled while finely adjusting the engine output even in a rotation speed range outside the idling engine speed range.

In a preferred embodiment of the present invention, the output operation unit is a trolling output operation unit operated by the operator to adjust the engine output during trolling. With the above-described arrangement, a trolling propulsion function in a higher rotation speed range in comparison to the prior art can be achieved.

In a preferred embodiment of the present invention, the control unit sets a variation amount of the engine output from the reference output in accordance with the operation of the output operation unit. With the above-described arrangement, the engine output corresponding to the operation amount of the accelerator operation unit is used as the reference and when the output operation unit is operated, the variation amount from the reference engine output is set in accordance with the operation. The operator can thus set the reference engine output by operating the accelerator operation unit and thereafter adjust the engine output by operating the output operation unit.

In a preferred embodiment of the present invention, the output operation unit is arranged to output commands of a plurality of steps in accordance with the operation by the operator and, in accordance with the commands output from the output operation unit, the control unit is programmed to vary the engine output with respect to the reference output by variation amounts that are set in a plurality of steps. With the above-described arrangement, the engine output can be finely adjusted by the stepped set variation amounts in accordance with the operation of the output operation unit. Fine adjustment of the engine output can thus be performed by an easy operation.

In a preferred embodiment of the present invention, the output operation unit includes an output increasing operating member which is operated to increase the engine output, and the control unit increases the engine output by a predetermined amount in response to operation of the output increasing operating member. Also in a preferred embodiment of the present invention, the output operation unit includes an output decreasing operating member which is operated to decrease the engine output, and the control unit decreases the engine output by a predetermined amount in response to operation of the output decreasing operating member. With the above-described arrangements, the engine output is increased or decreased by the predetermined amount in response to the operation of the output increasing operating member or the output decreasing operating member. Operation of the output operation unit is thus simple and there is no difficulty in the operation for fine adjustment of the engine output. A user can thus finely adjust the engine output by an easy operation.

In a preferred embodiment of the present invention, the control unit varies an ignition timing of the engine to vary the engine output when the throttle opening degree is maintained at the fixed value other than the idling opening degree. With the above arrangement, the engine output can be varied by varying the ignition timing. Thus, there is no need to add special components and a trolling propulsion function in a high rotation speed range can be provided by an inexpensive arrangement.

A vessel propulsion system according to a preferred embodiment of the present invention further includes a bypass passage that bypasses the throttle valve to supply air to the engine, and an idle opening degree adjustment valve disposed in the bypass passage and capable of being adjusted in its opening degree. The control unit is programmed to vary the opening degree of the idling opening degree adjustment valve to vary the engine output when the throttle opening degree is maintained at the fixed value other than the idling opening degree. With the above-described arrangement, when the throttle opening degree is maintained at the fixed value other than the idling opening degree, the engine output is varied by varying the opening degree of the idling opening degree adjustment valve disposed in the bypass passage. The arrangement to control the idling engine speed can thus be used to provide the trolling propulsion function in the high rotation speed range, for example. That is, in the vessel propulsion system including the idling opening degree adjustment valve, the trolling propulsion function in the high rotation speed range can be provided without adding a new component or device.

In a preferred embodiment of the present invention, the control unit sets a reference target engine speed that is in accordance with the operation amount of the accelerator operation unit, varies the target engine speed based on the reference target engine speed, and controls the engine so that the target engine speed is attained. With the above-described arrangement, the target engine speed is determined based on the reference target engine speed and the engine output is controlled based on the target engine speed. The engine output can thus be adjusted accurately and appropriately.

In a preferred embodiment of the present invention, the control unit includes a plurality of control modes including an ordinary mode of controlling the engine output in accordance with the operation amount of the accelerator operation unit and a trolling mode of varying the engine output even when the operation amount of the accelerator operation unit is maintained at a fixed value. With the above-described arrangement, the control unit includes the plurality of control modes, and these control modes include the ordinary mode and the trolling mode. In the trolling mode, the engine output is adjusted in accordance with the operation of the output operation unit. By switching the control mode, the engine output during trolling can be changed in accordance with the operation of the output operation unit, and the engine output can be varied in accordance with the operation of the accelerator operation unit during ordinary running.

In a preferred embodiment of the present invention, the control unit in the trolling mode cancels the trolling mode in response to the operation amount of the accelerator operation unit becoming no less than a predetermined operation amount or in response to the operation amount of the accelerator operation unit varying by no less than a predetermined value from the fixed value. With the above-described arrangement, the trolling mode is cancelled and a return to the ordinary mode is performed when the operation amount of the accelerator operation unit becomes no less than the predetermined operation amount or when the operation amount of the accelerator operation unit varies by no less than the predetermined value. The control mode can thus be made to change from the trolling mode to the ordinary mode by operating the accelerator operation unit and, thereafter, the engine output is varied in accordance with the operation of the accelerator operation unit. The switching of the control mode can thus be performed without making the user feel a sense of incongruity.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a perspective view for describing another non-limiting example of an operation system of a vessel.

DETAILED DESCRIPTION OF THE PREFERRED EMBODIMENTS

Figure 1:
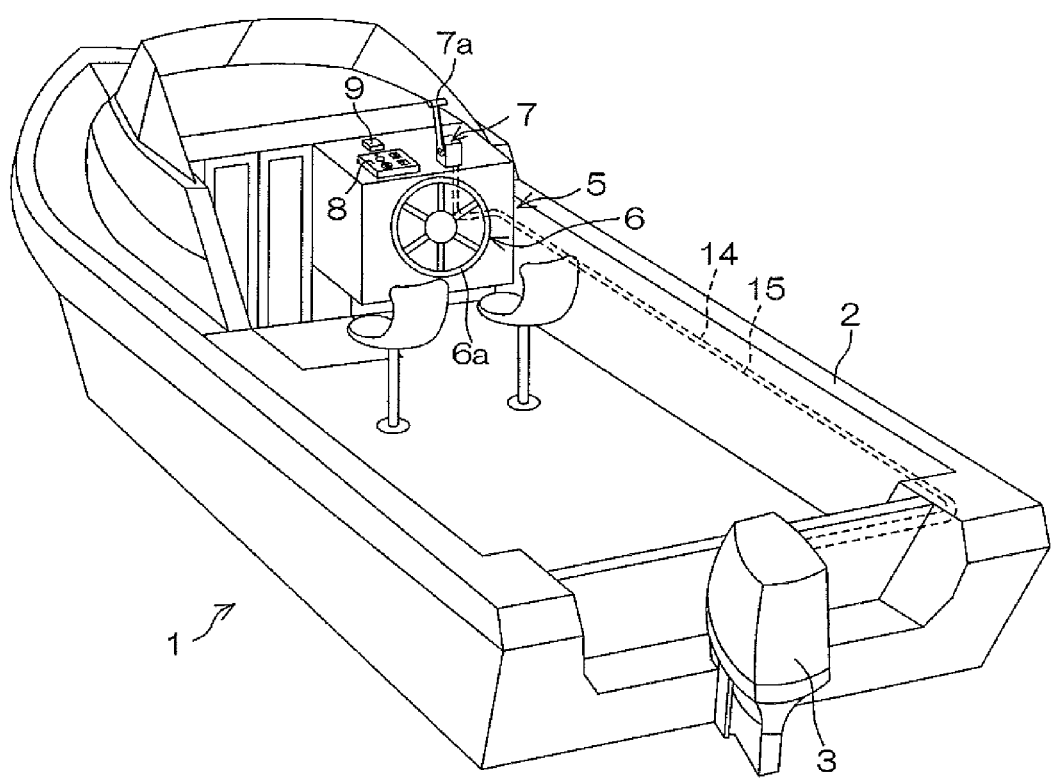
FIG. 1 is a perspective view for describing an arrangement of a vessel to which a vessel propulsion system according to a preferred embodiment of the present invention is applied.

FIG. 1 is a perspective view for describing a vessel according to a preferred embodiment of the present invention. The vessel 1 includes a hull 2 and an outboard motor 3 as a propulsion device. The outboard motor 3 is attached to a stern of the hull 2. The outboard motor 3 includes an engine, preferably an internal combustion engine, and generates a propulsive force by a propeller (screw) that is rotated by a driving force of the engine.

A vessel operator compartment 5 is provided at a front portion (stem side) of the hull 2. The vessel operator compartment 5 includes a steering operation apparatus 6, a remote controller 7, an operation panel 8, and a gauge 9.

The steering operation apparatus 6 includes a steering wheel 6a that is rotatingly operated by a vessel operator. The operation of the steering wheel 6a is mechanically transmitted by a steering cable (not shown) to a steering mechanism (not shown) provided at the stern. The steering mechanism rotates the outboard motor 3 to the right and left to change its direction. As a result, a direction of the propulsive force generated by the outboard motor 3 is changed and a heading direction of the vessel 1 can be changed accordingly. A power steering device that includes a sensor detecting a steering operation angle of the steering wheel 6a and an actuator driven in accordance with the steering operation angle detected by the sensor may be used. In this case, there is no mechanical coupling between the steering wheel 6a and the steering mechanism, the actuator is driven by a control signal that is in accordance with the steering wheel operation, and the outboard motor 3 is steered by a driving force of the actuator.

The remote controller 7 is a non-limiting example of an accelerator operation unit. The remote controller 7 includes a lever 7a that can be inclined to the front and rear, and an operation of the lever 7a is transmitted to the outboard motor 3 via a throttle cable 14 and a shift cable 15. The throttle cable 14 is coupled to a throttle valve of the engine included in the outboard motor 3. Also, the shift cable 15 is coupled to a shift mechanism included in the outboard motor 3. By transmission of the operation of the lever 7a by the shift cable 15, a shift position of the outboard motor 3 is set at a forward drive position when the lever 7a is inclined forward from a predetermined neutral position to a predetermined forward drive shift-in position. As a result, a propulsive force in the forward drive direction is generated from the outboard motor 3. Also, when the lever 7a is inclined rearward from the neutral position to a predetermined reverse drive shift-in position, the shift position of the outboard motor 3 is set at a reverse drive position and a propulsive force in the reverse drive direction is generated from the outboard motor 3. When the lever 7a is at a position between the forward drive shift-in position and the reverse drive shift-in position, the shift position of the outboard motor 3 is set at a neutral position and the outboard motor 3 does not generate a propulsive force. Also, by the operation of the lever 7a being transmitted by the throttle cable 14, a throttle opening degree changes in accordance with an inclination amount of the lever 7a and an output of the outboard motor 3, that is, an engine speed of the engine included in the outboard motor 3 can thus be changed. More specifically, by inclining the lever 7a farther forward from the forward drive shift-in position, the throttle opening degree can be increased to increase the output of the outboard motor 3 and make a large propulsive force in the forward drive direction be generated from the outboard motor 3. Similarly, by inclining the lever 7a farther rearward from the reverse drive shift-in position, the throttle opening degree can be increased to increase the output of the outboard motor 3 and make a large propulsive force in the reverse drive direction be generated from the outboard motor 3.

In the outboard motor 3, a target engine speed is set in accordance with the throttle opening degree. Specifically, up to the inclination position of the predetermined amount (between the forward drive shift-in position and the reverse drive shift-in position), the throttle opening degree is set to fully closed state and accordingly, the target engine speed is set to an idling engine speed. A range of the engine speed no more than the idling engine speed is an idling engine speed range. When the lever 7a is inclined forward beyond the forward drive shift-in position or inclined rearward beyond the reverse drive shift-in position, the throttle opening degree increases with an increasing lever inclination amount and the target engine speed increases accordingly.

The gauge 9 displays a state of the outboard motor 3. More specifically, on/off of a power supply of the outboard motor 3, the engine speed, and other necessary information are displayed.

Figure 2:
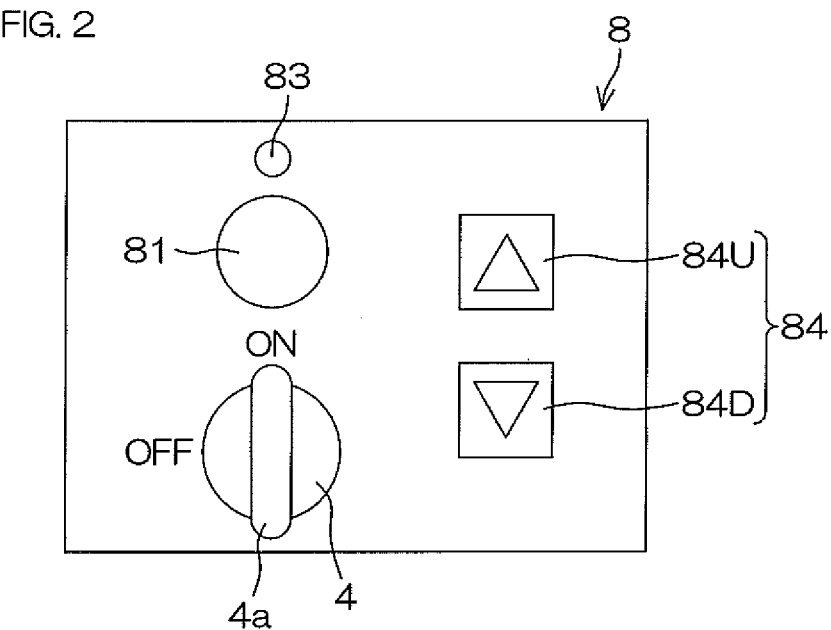
FIG. 2 is an enlarged plan view of an operation panel provided in the vessel.

As shown in an enlarged manner in FIG. 2, the operation panel 8 includes a key switch 4, a start/stop switch 81, a power supply lamp 83, and a trolling output operation portion 84.

The key switch 4 is a switch that is operated to turn on the power supply of the outboard motor 3. The key switch 4 can be operated between an off position (OFF) and an on position (ON) upon insertion of a corresponding key 4a into a key cylinder. The off position is an operation position for interrupting the power supply to the outboard motor 3. The on position is an operation position for turning on the power supply to the outboard motor 3. The power supply lamp 83 includes, for example, an LED lamp and is an indicator that lights up when the power supply to the outboard motor 3 is turned on and becomes unlit when the power supply is turned off.

The start/stop switch 81 is a switch that is operated for starting/stopping the engine of the outboard motor 3 and may be, for example, a momentary switch. By operating the start/stop switch 81 in an engine-stopped state, a starting command to start the engine of the outboard motor 3 can be generated. Also, by operating the start/stop switch 81 while the engine is in operation, a stop command to stop the engine of the outboard motor 3 can be generated.

The trolling output operation portion 84 includes an output increasing switch 84U that increases the engine output by a predetermined amount and an output decreasing switch 84D that decreases the engine output by a predetermined amount. The output increasing switch 84U is a non-limiting example of an output increasing operating member and the output decreasing switch 84D is a non-limiting example of an output decreasing operating member. By operating the switches 84U and 84D, the engine speed can be increased/decreased in a stepwise manner with the idling engine speed as a reference target engine speed, and thus the engine output can be finely adjusted. The trolling output operation portion 84 is used to cause the vessel 1 to run with the engine output fixed, typically when trolling is to be performed. Trolling refers to a vessel travel mode to cause the vessel 1 to travel at a fixed speed or to keep the vessel 1 at a fixed point against a tidal current or wind.

Figure 3:
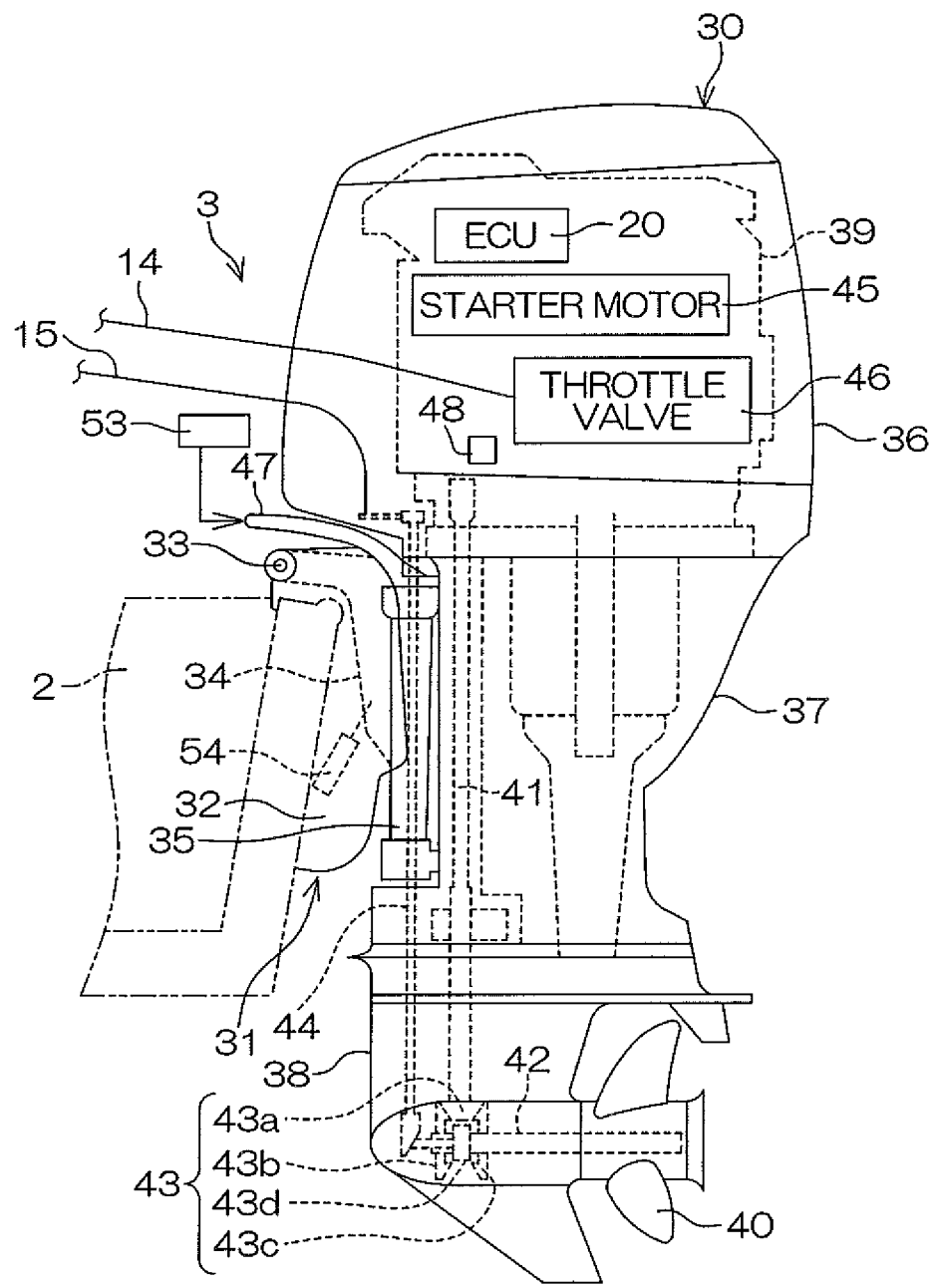
FIG. 3 is a diagram for describing an outboard motor that is a propulsion device of the vessel.

FIG. 3 is a diagram for describing the outboard motor 3. The outboard motor 3 includes a propulsion unit 30 and an attachment mechanism 31 arranged to attach the propulsion unit 30 to the hull 2. The attachment mechanism 31 includes a clamp bracket 32 detachably fixed to a transom of the hull 2, and a swivel bracket 34 coupled to the clamp bracket 32 in a manner enabling rotation around a tilt shaft 33 as a horizontal rotational axis. The propulsion unit 30 is attached to the swivel bracket 34 in a manner enabling rotation around a steering shaft 35. A steering angle (azimuth angle defined by the direction of the propulsive force with respect to a center line of the hull 2) can thus be changed by rotating the propulsion unit 30 around the steering shaft 35. Also, a trim angle of the propulsion unit 30 can be changed by rotating the swivel bracket 34 around the tilt shaft 33. The trim angle corresponds to an angle of attachment of the outboard motor 3 with respect to the hull 2.

A housing of the propulsion unit 30 includes a top cowling 36, an upper case 37, and a lower case 38. Inside the top cowling 36, the engine 39, which is a driving source, is installed with an axis of a crankshaft thereof extending vertically. A driveshaft 41 for power transmission is connected to a lower end of the crankshaft of the engine 39 and extends vertically through the upper case 37 and into the lower case 38.

A propeller 40 is rotatably attached as a propulsive force generating member to a lower rear side of the lower case 38. A propeller shaft 42, which is a rotation shaft of the propeller 40, extends horizontally in the lower case 38. The rotation of the driveshaft 41 is transmitted to the propeller shaft 42 via a shift mechanism 43 as a clutch mechanism.

The shift mechanism 43 includes a drive gear 43*a*, preferably a bevel gear, fixed to a lower end of the driveshaft 41, a forward drive gear 43*b*, preferably a bevel gear, rotatably disposed on the propeller shaft 42, a reverse drive gear 43*c*, preferably a bevel gear, rotatably disposed similarly on the propeller shaft 42, and a dog clutch 43*d* disposed between the forward drive gear 43*b* and the reverse drive gear 43*c*.

The forward drive gear 43*b* is engaged with the drive gear 43*a* from a front side, and the reverse drive gear 43*c* is engaged with the drive gear 43*a* from a rear side. The forward drive gear 43*b* and the reverse drive gear 43*c* thus rotate in mutually opposite directions.

The dog clutch 43*d* is spline-coupled to the propeller shaft 42. That is, the dog clutch 43*d* can slide with respect to the propeller shaft 42 in the axial direction of the shaft 42 but is not rotatable relative to the propeller shaft 42 and rotates together with the propeller shaft 42.

The dog clutch 43*d* slides on the propeller shaft 42 by axial rotation of a shift rod 44 that extends vertically and in parallel to the driveshaft 41. Thus, the dog clutch 43*d* is controlled to be set at a shift position among a forward drive position coupled to the forward drive gear 43*b*, a reverse drive position coupled to the reverse drive gear 43*c*, and a neutral position not coupled to either the forward drive gear 43*b* or the reverse drive gear 43*c*.

When the dog clutch 43*d* is at the forward drive position, the rotation of the forward drive gear 43*b* is transmitted to the propeller shaft 42 via the dog clutch 43*d*. Thus, the propeller 40 is rotated in one direction (forward drive direction) to generate a propulsive force in a direction for moving the hull 2 forward. On the other hand, when the dog clutch 43*d* is at the reverse drive position, the rotation of the reverse drive gear 43*c* is transmitted to the propeller shaft 42 via the dog clutch 43*d*. The reverse drive gear 43*c* rotates in a direction opposite to that of the forward drive gear 43*b*, and the propeller 40 is thus rotated in an opposite direction (reverse drive direction) to generate a propulsive force in a direction for moving the hull 2 in reverse. When the dog clutch 43*d* is at the neutral position, the rotation of the driveshaft 41 is not transmitted to the propeller shaft 42. That is, a driving force transmission path between the engine 39 and the propeller 40 is interrupted so that a propulsive force is not generated in any direction.

In association with the engine 39, a starter motor 45 to start the engine 39 is disposed. The starter motor 45 is controlled by an ECU (electronic control unit) 20 as a control unit. The engine 39 further includes an engine speed sensor 48 that detects a rotational speed of the engine 39 by detecting the rotation of the crankshaft.

The throttle valve 46 is disposed in an air intake passage of the engine 39. The throttle cable 14 is coupled to the throttle valve 46. The shift cable 15 is coupled to the shift rod 44.

A steering mechanism 53, driven by the steering operation apparatus 6 (see FIG. 1), is coupled to a steering rod 47 fixed to the propulsion unit 30. The propulsion unit 30 is rotated around the steering shaft 35 by the steering mechanism 53 and a steering operation can thus be performed.

A trim actuator (tilt/trim actuator) 54, which includes, for example, a hydraulic cylinder and is controlled by the ECU 20, is provided between the clamp bracket 32 and the swivel bracket 34. The trim actuator 54 rotates the swivel bracket 34 around the tilt shaft 33 to rotate the propulsion unit 30 around the tilt shaft 33.

Figure 4:
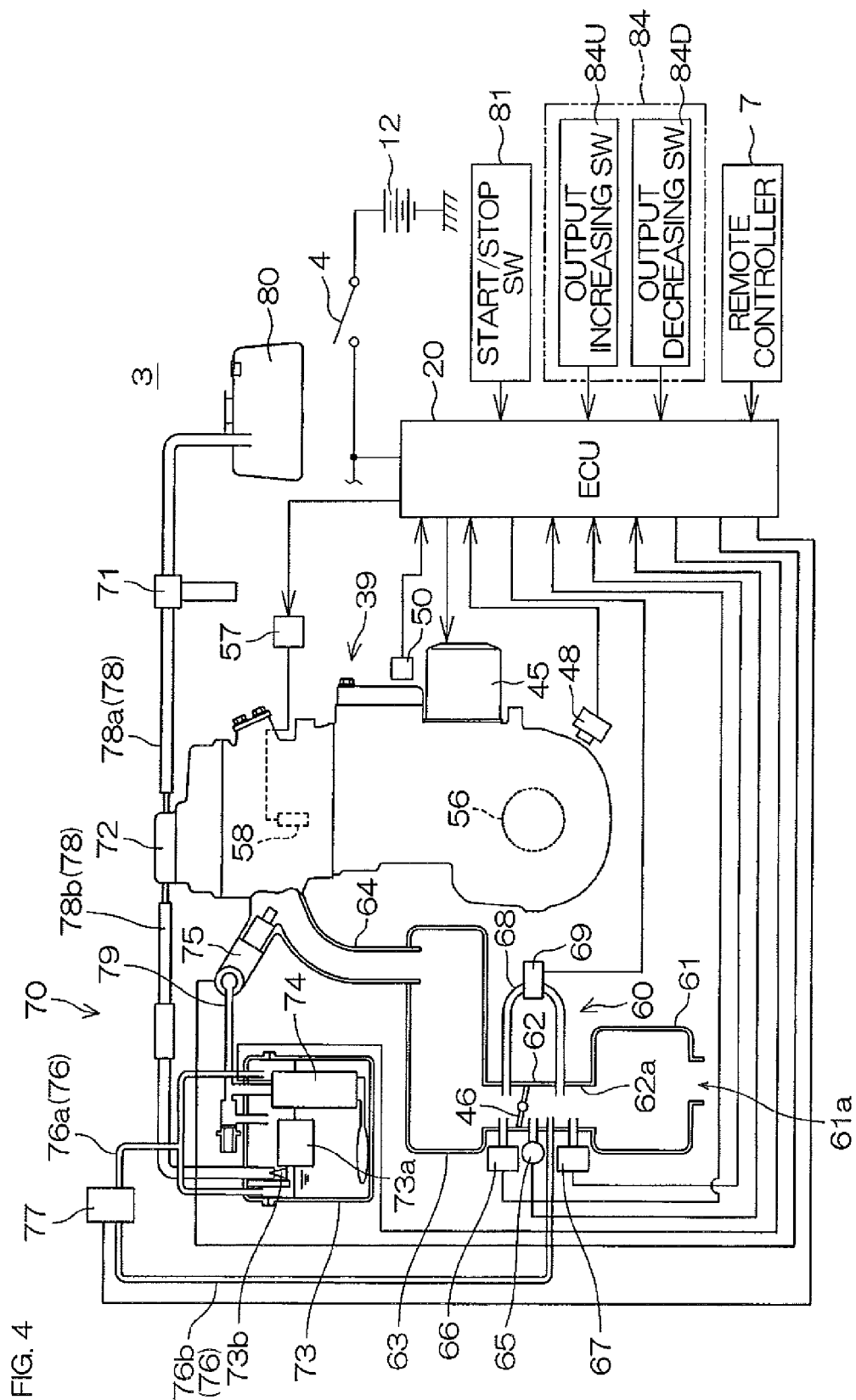
FIG. 4 is a diagram for describing an engine system that includes an engine provided in the outboard motor.

FIG. 4 is a diagram for describing the engine system including the engine 39. The engine system includes the engine, preferably an internal combustion engine, 39, an air intake system 60, a fuel system 70, and the ECU 20 as the control unit. The air intake system 60 supplies air to the engine 39. The fuel system 70 supplies fuel to the engine 39. The engine 39 may, for example, be a four-stroke cycle engine that uses gasoline for fuel.

In association with the engine 39, the engine speed sensor 48 and an engine temperature sensor 50 are preferably provided. The engine speed sensor 48 includes a crank angle sensor that generates a pulse signal in accordance with the rotation of the crankshaft 56 of the engine 39. The ECU 20 can calculate the engine speed based on an output signal of the engine speed sensor 48.

The air intake system 60 includes, for example, a silencer case 61, a throttle body 62, a surge tank 63, and an air intake tube 64 for each cylinder of the engine 39, which define the air intake passage. The silencer case 61 includes an air intake port 61*a* that is open to the atmosphere. The throttle body 62 is connected to the silencer case 61. The surge tank 63 is connected to the throttle body 62. The air intake tube 64 for each cylinder extends from the surge tank 63 and is connected to an air intake port of the corresponding cylinder of the engine 39.

The throttle body 62 includes an air passage 62*a* with an inner surface preferably having a cylindrical shape. The throttle valve 46 is preferably a butterfly type valve, and is provided in the air passage 62*a*.

In order to collect information used to control a fuel injection amount of an injector 75, to be described below, a throttle opening degree sensor 65, an intake air pressure sensor 66, and an intake air temperature sensor 67 are attached to the throttle body 62. The throttle opening degree sensor 65 detects the opening degree of the throttle valve 46. The intake air pressure sensor 66 detects a pressure of the air taken in via the air passage 62*a*. The intake air temperature sensor 67 detects a temperature of the air taken in via the air passage 62*a*.

A bypass passage 68 is provided integral to the throttle body 62. The bypass passage 68 connects an upstream side and a downstream side with respect to the throttle valve 46 of the air passage 62*a*. In other words, the bypass passage 68 bypasses the throttle valve 46 to place a side of the air passage 62*a* that is closer to the engine 39 than the throttle valve 46 in communication with the atmosphere. An idle speed control (ISC) valve 69 is interposed in the bypass passage 68. The ISC valve 69 is a valve that is controllable to a fully open state, a fully closed state, and opening degrees in between these states. In other words, the ISC valve 69 is an idle opening degree adjustment valve that is capable of being adjusted in its opening degree. The bypass passage 68 is designed, for example, so that by adjusting the opening degree of the ISC valve 69, air flows through at a flow rate that is necessary to maintain the idling engine speed of the engine 39.

The fuel system. 70 includes a filter 71, a low pressure fuel pump 72, a vapor separator tank 73, a high pressure fuel pump 74, an injector 75, a vapor piping 76 (76*a* and 76*b*), a vapor shut valve (VSV) 77, and a fuel piping 78 (78*a* and 78*b*).

The low pressure fuel pump 72 is driven by the engine 39. The low pressure fuel pump 72 and a fuel tank 80, disposed in the hull 2, are connected by the fuel piping 78a, and the filter 71 is interposed in the fuel piping 78a. The filter 71 traps foreign matter in the fuel. Further, the low pressure fuel pump 72 and the vapor separator tank 73 are connected by the fuel piping 78b. The low pressure fuel pump 72 pumps out fuel from the fuel tank 80 and supplies the fuel via the fuel piping 78 (78a and 78b) to the vapor separator tank 73.

The vapor separator tank 73 stores the fuel pumped up from the fuel tank 80 and separates fuel vapor or air from liquid fuel. The vapor separator tank 73 is arranged so that the fuel stored inside the vapor separator tank 73 is maintained at a fixed amount and so that a liquid level position of the fuel inside the vapor separator tank 73 is maintained at a predetermined height position. Specifically, a float 73a including a needle valve 73b is provided inside the vapor separator tank 73. The float 73a moves vertically in accordance with the liquid level height of the fuel, and the needle valve 73b opens/closes a discharge port of the fuel piping 78b accordingly. The liquid level position of the fuel inside the vapor separator tank 73 is thus maintained.

The high pressure fuel pump 74 is disposed inside the vapor separator tank 73 and transports the fuel inside the vapor separator tank 73 to the injector 75 via a delivery pipe 79. The fuel delivered at a predetermined pressure by the high pressure fuel pump 74 is injected by the injector 75 toward a vicinity of the air intake port of a cylinder (not shown) of the engine 39 at a predetermined timing.

An upper portion of the vapor separator tank 73 is connected via the vapor piping 76 to the throttle body 62. Thus, the vapor inside the vapor separator tank 73 is released to the air passage 62a of the throttle body 62. The vapor shut valve (VSV) 77 is interposed in the vapor piping 76. The vapor shut valve 77 is an on/off valve that opens/closes the vapor piping 76. A timing of releasing of the vapor can be controlled by controlling the vapor shut valve 77.

The ECU 20 is programmed to control actuators such as the high pressure fuel pump 74, the injector 75, the vapor shut valve 77, an ignition coil 57, the ISC valve 69, the starter motor 45, etc. The ignition coil 57 supplies energy for spark discharge to a spark plug 58 included in the engine 39. The spark plug 58 is disposed to perform spark discharge inside a combustion chamber of the engine 39. Electric power from a battery 12 is supplied via the key switch 4 to the ECU 20. Also, operation signals, such as an operation signal from the remote controller 7, an operation signal of the start/stop switch 81, an operation signal of the trolling output operation portion 84, etc., are input to the ECU 20. Further, detection signals from the sensors, such as the engine speed sensor 48, the engine temperature sensor 50, the throttle opening degree sensor 65, the intake air pressure sensor 66, the intake air temperature sensor 67, etc., are input into the ECU 20.

The ECU 20 is programmed to control the fuel injection amount of the injector 75 based on the detection results of the throttle opening degree sensor 65, the intake air pressure sensor 66, and the intake air temperature sensor 67. Also, when the throttle opening degree detected by the throttle opening degree sensor 65 corresponds to the fully closed state (for example, an idling opening degree), the ECU 20 sets the target engine speed based on the engine temperature detected by the engine temperature sensor 50.

During stoppage of the engine 39, the ECU 20 closes the vapor shut valve 77. When starting the engine 39, the ECU 20 opens the vapor shut valve 77. Even after the starting of the engine 39 has been completed, the ECU 20 maintains the vapor shut valve 77 in the open state during a period until a high temperature fuel inside the vapor separator tank 73 is replaced by a low temperature fuel supplied from the fuel tank 80.

Figure 5:
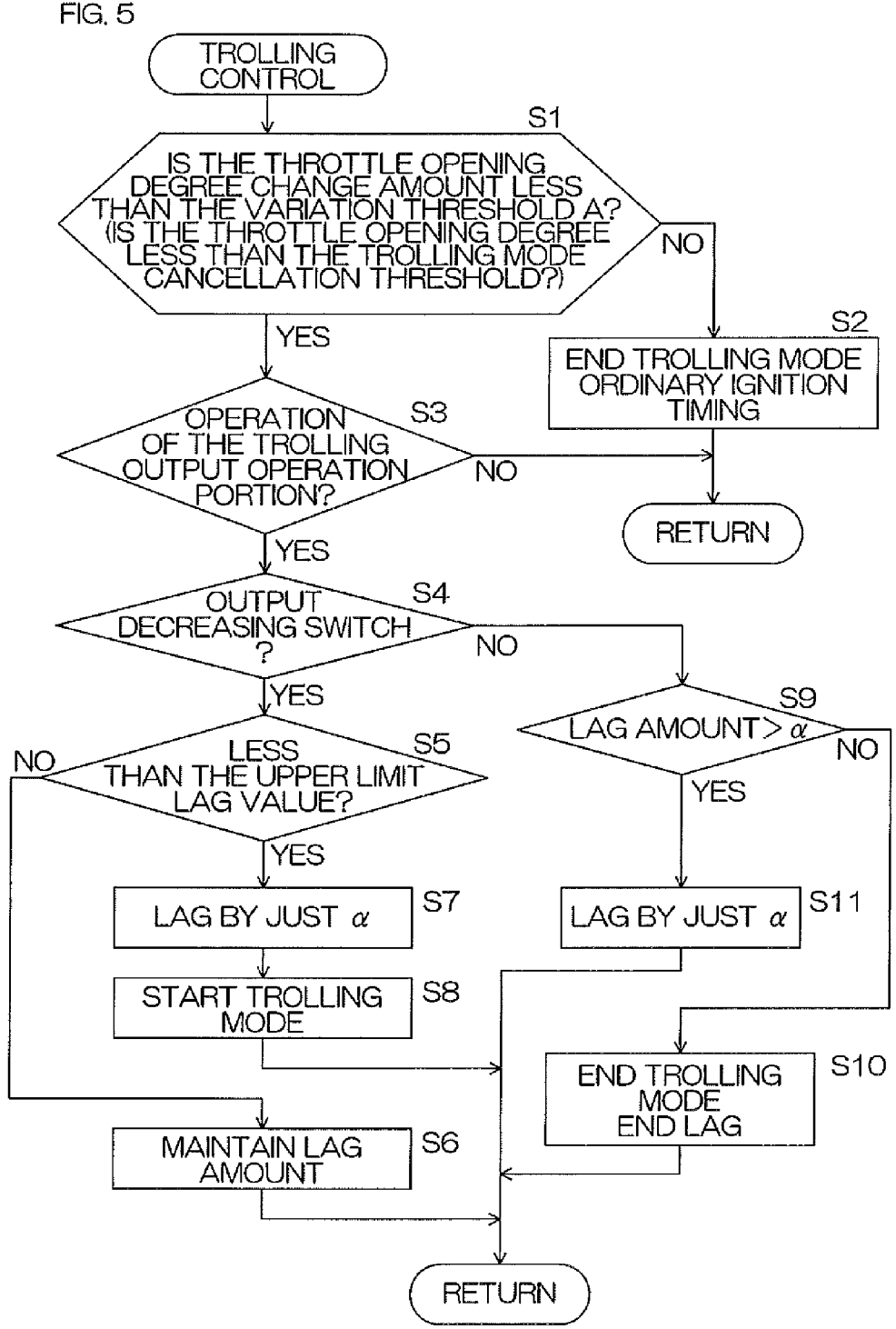
FIG. 5 is a flowchart for describing a first specific non-limiting example of a trolling control according to a preferred embodiment of the present invention.

FIG. 5 is a flowchart for describing a first specific non-limiting example of a trolling control by the ECU 20. The ECU 20 repeatedly executes the process shown in FIG. 5. The ECU 20 includes a plurality of control modes and controls the outboard motor 3 while switching among these control modes. The plurality of control modes preferably include a trolling mode and an ordinary mode, for example. The trolling mode is a control mode in which the engine output is varied in accordance with the operation of the trolling output operation portion 84 in a state where the throttle opening degree is maintained at a fixed value. The ordinary mode is a control mode in which the engine output is determined in accordance with the operation of the lever 7a of the remote controller 7, that is, in accordance with the throttle opening degree and does not respond to the operation of the trolling output operation portion 84.

The ECU 20 references and records the output signal of the throttle opening degree sensor 65 to judge whether or not a change amount (absolute value) of the throttle opening degree Th since the setting of the control mode to the trolling mode is less than a predetermined variation threshold A (A>0) (step S1). When the change amount of the throttle opening degree Th reaches the variation threshold A, the ECU 20 ends the trolling mode (step S2). That is, the control mode is switched to the ordinary mode. The judgment in step S1 may be replaced by a judgment of whether or not the throttle opening degree Th is less than a predetermined trolling mode cancellation threshold. That is, the trolling mode may be ended when the throttle opening degree Th reaches the trolling mode cancellation threshold.

In the present preferred embodiment, the throttle valve 46 preferably is mechanically coupled to the remote controller 7 by the throttle cable 14 and thus the throttle opening degree Th detected by the throttle opening degree sensor 65 corresponds to the operation amount (accelerator operation amount) of the remote controller 7.

In the present specific non-limiting example, the engine output is varied in the trolling mode by adjustment (more specifically, ignition lag control) of an ignition timing of the spark plug 58. More specifically, ignition lag control in a range from an ordinary ignition timing to a predetermined upper limit lag value B (0<B≤90 degrees) is performed. Within this range, a lag amount is increased to make the ignition timing lag when the engine output is to be decreased, and the lag amount is decreased to make the ignition timing lead when the engine output is to be increased. When the trolling mode is to be ended, the ignition timing is returned to the ordinary ignition timing. The ordinary ignition timing is, for example, a crank angle position of about 10 degrees before the top dead center. The lag amount is expressed, for example, by a rotation angle of the crankshaft between the crank angle position (for example, about 10 degrees before the top dead center) for the ordinary ignition timing and an ignition position set at an upstream side in the crankshaft rotation direction with respect to the above-mentioned crank angle position. The upper limit lag value B is preferably no more than approximately 90 degrees, and may be set, for example, to approximately 50 degrees.

The ECU 20 further judges whether or not the output increasing switch 84U or the output decreasing switch 84D of the trolling output operation portion 84 is operated (step S3). If operation of neither switch is detected, the process from step S1 is repeated. If operation of either of the switches 84U and 84D is detected (step S3: YES), the ECU 20 further judges whether or not the output decreasing switch 84D is operated (step S4). If the output decreasing switch 84D is operated (step S4: YES), whether or not the current lag amount is less than the upper limit lag value B is judged (step S5). If the lag amount has reached the upper limit lag value B (step S5: NO), further lagging cannot be performed and the process is ended with the lag amount being maintained (step S6). On the other hand, if the lag amount is less than the upper limit lag value (step S5: YES), the ECU 20 increases the lag amount by a predetermined lag variation amount $\alpha$ (0<$\alpha$; for example, $\alpha$=5 degrees) (step S7). If the control mode at this point is not the trolling mode, the ECU 20 switches the control mode to the trolling mode (step S8).

If a negative judgment is made in step S4, this means that the output increasing switch 84U is operated. The ECU 20 thus judges whether or not the current lag amount is greater than the lag variation amount $\alpha$ (step S9). That is, it is judged whether or not it is possible to lead the ignition timing within a range of not beyond the ordinary ignition timing. If a negative judgment is made here, the engine output cannot be increased further and the ECU 20 thus sets the lag amount to zero to make the ignition timing return to the ordinary ignition timing and ends the trolling mode to restore the control to the ordinary mode (step S10). On the other hand, if the current lag amount is no more than the lag variation amount $\alpha$, the ECU 20 makes the ignition timing lead by just the lag variation amount $\alpha$ (step S11).

By performing such a process, each time the trolling output operation portion 84 is operated, the engine output is increased or decreased in a stepwise manner each time by an amount corresponding to the lag variation amount $\alpha$ in response to the operation, regardless of whether or not the engine speed N is in the idling engine speed range. That is, from a state where the operator operates the lever 7a of the remote controller 7 to adjust the throttle opening degree to approximately set the engine output, the trolling output operation portion 84 can be operated to perform fine adjustment of the engine output. Fine adjustment of the engine output in a stepwise manner can thus be performed by operation of the trolling output operation portion 84 even in the case where the throttle opening degree is other than the idling opening degree (for example, the fully closed state), as long as it is maintained at a fixed value (see step S1). Consequently, fine adjustment of the engine output can be performed not only in the case where the engine speed is low but also in a comparatively high engine speed region. A trolling function that is very useful can thus be provided.

Also, by switching from operation of the lever 7a of the remote controller 7 to operation of the trolling output operation portion 84, the control mode is made to change from the ordinary mode to the trolling mode. By operating the lever 7a of the remote controller 7 to increase or decrease the throttle opening degree beyond the variation threshold A, a transition from the trolling mode to the ordinary mode is performed. Therefore, the vessel operator does not need to be conscious of the control mode and the adjustment of the engine output is easy.

Figure 6:
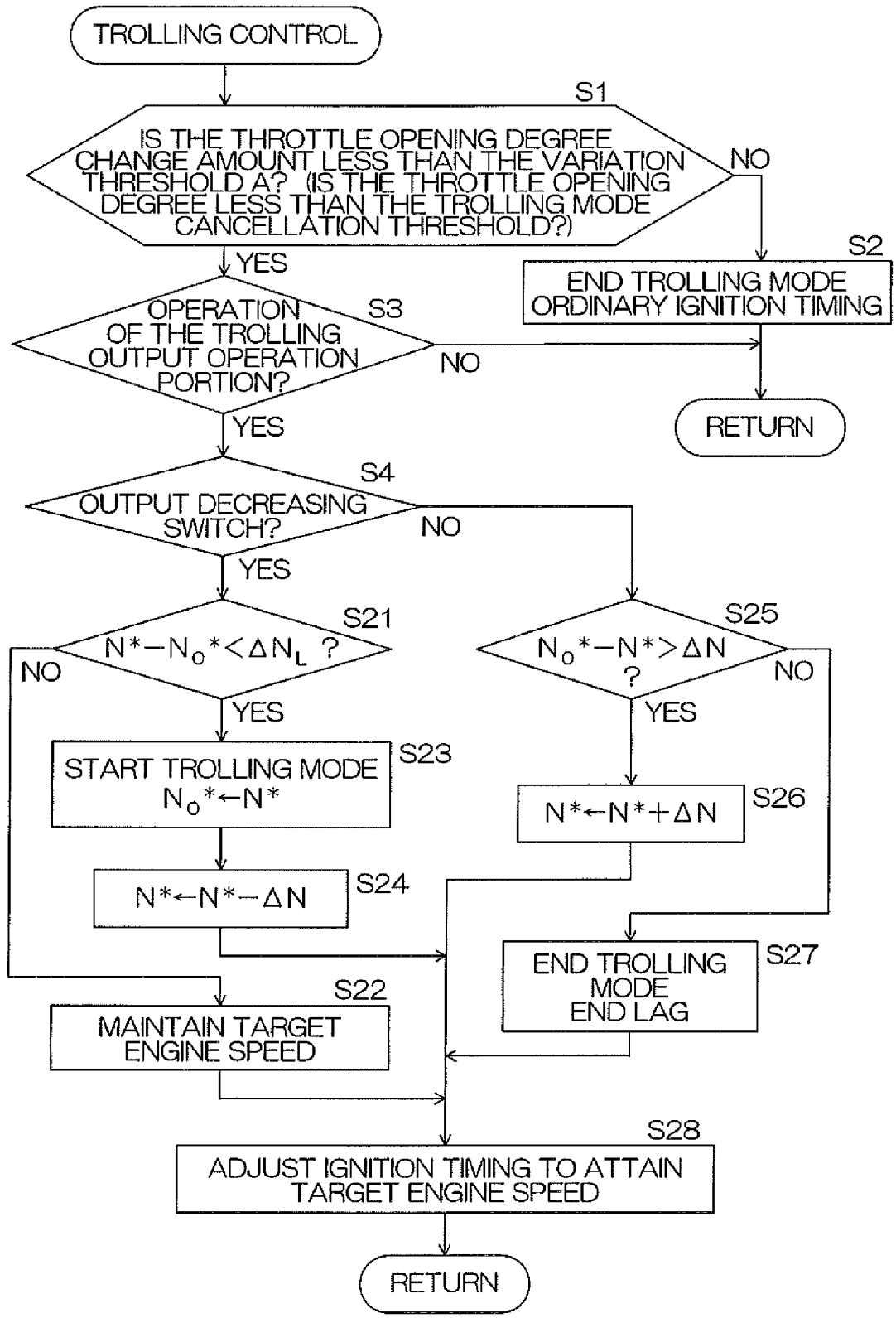
FIG. 6 is a flowchart for describing a second specific non-limiting example of a trolling control according to a preferred embodiment of the present invention.

FIG. 6 is a flowchart for describing a second specific non-limiting example of a trolling control by the ECU 20. In FIG. 6, the steps of performing the same process as the respective steps of FIG. 5 described above are indicated by the same reference symbols as in FIG. 5. In the first specific non-limiting example shown in FIG. 5, the ignition timing is changed each time by the fixed lag variation amount $\alpha$. In contrast, in the second specific non-limiting example shown in FIG. 6, the ignition timing is adjusted so that the engine speed varies each time by a fixed engine speed variation amount $\Delta N$ in response to the operation of the trolling output operation portion 84.

In the ordinary mode, the ECU 20 sets a target engine speed $N^*$ that is in accordance with the throttle opening degree, controls the fuel injection amount, etc., so that the target engine speed $N^*$ is attained, and thus causes the engine output to correspond to the throttle opening degree. On the other hand, in the trolling mode, the ECU 20 varies the target engine speed $N^*$ in accordance with the operation of the trolling output operation portion 84 and adjusts the ignition timing of the spark plug 58 so that the target engine speed $N^*$ is attained.

More specifically, the ECU 20 stores the target engine speed $N^*$ when the trolling mode is started as an initial target engine speed $N_0^*$. When the output decreasing switch 84D is operated (step S4: YES), the ECU 20 judges whether or not a difference between the initial target engine speed $N_0^*$ and the current target engine speed $N^*$ is less than a predetermined threshold $\Delta N_L$ (step S21). If the difference reaches the threshold $\Delta N_L$, the ECU 20 maintains the current target engine speed $N^*$ (step S22). On the other hand, if the difference does not reach threshold $\Delta N_L$ (step S21: YES), the ECU 20 decreases the target engine speed $N^*$ by a predetermined variation amount $\Delta N$ (for example, $\Delta N$=50 rpm) (step S24). If prior to this the trolling mode has not been entered, the ECU 20 switches the control mode to the trolling mode and sets the target engine speed $N^*$ before the change as the initial target engine speed $N_0^*$ (step S23). The threshold $\Delta N_L$ is an upper limit value of the engine speed changing amount that is attainable by decreasing the lag of the ignition timing.

On the other hand, if a negative judgment is made in step S4, this means that the output increasing switch 84U is operated. The ECU 20 thus judges whether or not the difference between the initial target engine speed $N_0^*$ and the current target engine speed $N^*$ is greater than the variation amount $\Delta N$ (step S25). That is, it is judged whether or not there is leeway for increasing the target engine speed $N^*$ within a range of not exceeding the initial target engine speed $N_0^*$. If a negative judgment is made here, the target engine speed $N^*$ cannot be increased further and the ECU 20 sets the lag amount to zero to cause the ignition timing to return to the ordinary ignition timing and ends the trolling mode to restore the control according to the ordinary mode (step S27). On the other hand, if there is leeway to increase the target engine speed $N^*$ by the variation amount $\Delta N$ (step S25: YES), the ECU 20 increases the target engine speed $N^*$ by the variation amount $\Delta N$ (step S26).

The ECU 20 then performs feedback control of the ignition timing based on the output of the engine speed sensor 48 to attain the target engine speed $N^*$ that is increased/decreased as described above (step S28).

By performing such a process, each time the trolling output operation portion 84 is operated, the engine speed is increased or decreased by the predetermined variation amount $\Delta N$ in response to the operation, regardless of whether or not the engine speed N is in the idling engine speed range. That is, from the state of operating the lever 7a of the remote controller 7 to adjust the throttle opening degree and approximately set the engine output, the operator operates the trolling output operation portion 84 and the target engine speed $N^*$ at that point is set as the initial target engine speed $N_0^*$. With this initial target engine speed $N_0^*$ as the reference target engine speed, the target engine speed is finely adjusted in a stepwise manner each time the trolling output operation portion 84 is operated. Fine adjustment of the engine output in a stepwise manner can thus be performed by operation of the trolling output operation portion 84 even in the case where the throttle opening degree is other than the idling opening degree (for example, the fully closed state), as long as it is maintained at a fixed value (see step S1). Consequently, fine adjustment of the engine speed can be performed not only in the case where the engine speed is low but also in a comparatively high engine speed region. A trolling function that is highly useful can thus be provided. In addition to this, the same effects as the first specific non-limiting example can be realized.

Further, with the second specific non-limiting example, the ignition timing is controlled so that the target engine speed N* changes each time by the predetermined variation amount ΔN, and the engine output can thus be adjusted more accurately. Thus, a trolling function that is even more useful can be provided.

Figure 7:
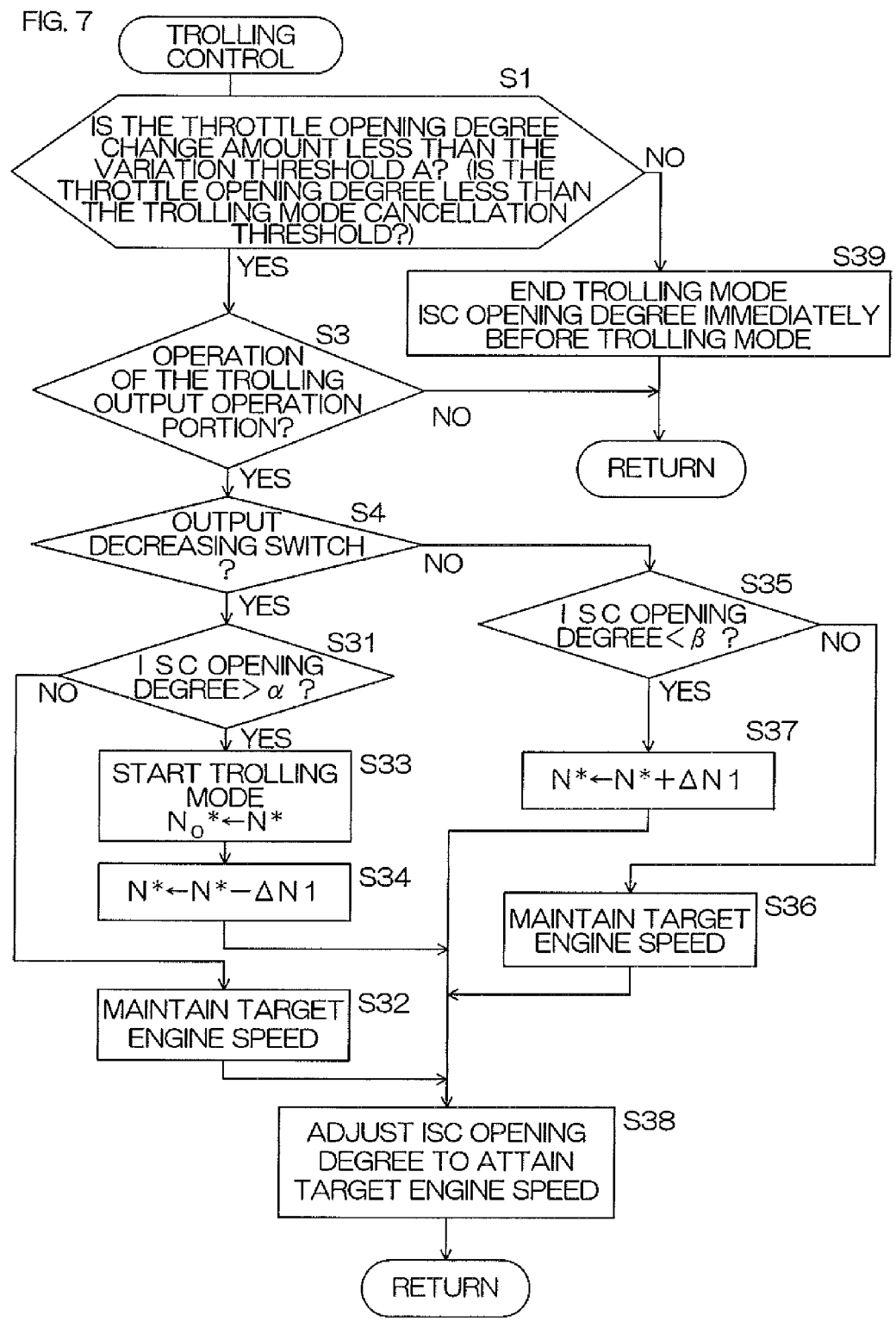
FIG. 7 is a flowchart for describing a third specific non-limiting example of a trolling control according to a preferred embodiment of the present invention.

FIG. 7 is a flowchart for describing a third specific non-limiting example of a trolling control by the ECU 20. In FIG. 7, steps of performing the same process as the respective steps of FIG. 6 described above are indicated by the same reference symbols as in FIG. 6. In the first and second specific non-limiting examples, the engine output is varied in the trolling mode by ignition lag control of the ignition timing. In contrast, in the third specific non-limiting example, the engine output is adjusted in the trolling mode by adjustment of the opening degree of the ISC valve 69.

In the ordinary mode, the ECU 20 sets a target engine speed N* that is in accordance with the throttle opening degree, controls the fuel injection amount, etc., so that the target engine speed N* is attained, and thus causes the engine output to correspond to the throttle opening degree. On the other hand, in the trolling mode, the ECU 20 varies the target engine speed N* in accordance with the operation of the trolling output operation portion 84 and adjusts the opening degree of the ISC valve 69 so that the target engine speed N* is attained.

More specifically, the ECU 20 stores the target engine speed N* when the trolling mode is started as an initial target engine speed $N_0^*$. When the output decreasing switch 84D is operated (step S4: YES), the ECU 20 judges whether or not the opening degree (ISC opening degree) of the ISC valve 69 is greater than an adjustment lower limit value α (for example, α=30%) (step S31). If the opening degree of the ISC valve 69 is no more than the adjustment lower limit value α (step S31: NO), the ECU 20 maintains the current target engine speed N* (step S32). On the other hand, if the opening degree of the ISC valve 69 is greater than the adjustment lower limit value α (step S31: YES), the ECU 20 deceases the target engine speed N* by a predetermined variation amount ΔN1 (for example, ΔN1=50 rpm) (step S34). If prior to this the trolling mode has not been entered, the ECU 20 switches the control mode to the trolling mode and further sets the target engine speed N* before the change as the initial target engine speed $N_0^*$ (step S33).

On the other hand, if a negative judgment is made in step S4, this means that the output increasing switch 84U is operated. The ECU 20 thus judges whether or not the current opening degree of the ISC valve 69 is less than an opening degree adjustment upper limit value β (β>α; for example, β=70%) (step S35). If a negative judgment is made here, the ECU 20 maintains the current target engine speed N* (step S36). On the other hand, if the opening degree of the ISC valve 69 is less than the opening degree adjustment upper limit value β (step S35: YES), the ECU 20 increases the target engine speed N* by ΔN1 (step S37).

The ECU 20 then performs feedback control of the opening degree of the ISC valve 69 based on the output of the engine speed sensor 48 to attain the target engine speed N* that is increased/decreased as described above (step S38).

By performing such a process, each time the trolling output operation portion 84 is operated, the engine speed is increased or decreased by the predetermined variation amount ΔN1 in response to the operation regardless of whether or not the engine speed N is in the idling engine speed range. That is, from the state of operating the lever 7a of the remote controller 7 to adjust the throttle opening degree and approximately set the engine output, the operator operates the trolling output operation portion 84 and the target engine speed N* at that point is set as the initial target engine speed $N_0^*$. With this initial target engine speed $N_0^*$ as the reference target engine speed, the target engine speed is finely adjusted in a stepwise manner each time the trolling output operation portion 84 is operated. Fine adjustment of the engine speed in a stepwise manner can thus be performed by operation of the trolling output operation portion 84 even in the case where the throttle opening degree is other than the idling opening degree (for example, the fully closed state), as long as it is maintained at a fixed value (see step S1). Consequently, fine adjustment of the engine speed can be performed not only in the case where the engine speed is low but also in a comparatively high engine speed region. A trolling function that is highly useful can thus be provided. In addition to this, the same effects as the first specific non-limiting example can be realized.

When in the trolling mode and the throttle opening degree variation amount exceeds the variation threshold A (step S1: NO), the ECU 20 controls the opening degree of the ISC valve 69 to the opening degree immediately before the trolling mode was entered and ends the trolling mode (step S39).

Although preferred embodiments of the present invention have been described above, preferred embodiments of the present invention may include other modes. For example, according to a preferred embodiment described above, the trolling output operation portion 84 preferably includes the output increasing switch 84U and the output decreasing switch 84D. However, the trolling output operation portion for fine adjustment of the engine output in the trolling mode may be provided by another operating member, such as a knob (dial), etc., that is rotatably operable.

Further, although in a preferred embodiment described above, the operation system preferably includes the steering operation apparatus 6 and the remote controller 7, preferred embodiments of the present invention can also be applied to an operation system such as that shown in FIG. 8. In this example, a tiller handle 90 is coupled to the steering rod 47 (see FIG. 3) of the outboard motor 3. The vessel operator can move the tiller handle 90 to the right and left to rotate the outboard motor 3 to the right and left with respect to the hull 2 to change the direction of the propulsive force to perform steering. A throttle control grip 91 is provided at a tip portion of the tiller handle 90. The throttle control grip 91 is arranged to enable rotation around a shaft portion of the tiller handle 90. Rotation operation of the throttle control grip 91 is mechanically transmitted to the throttle valve 46 (see FIG. 3). Also, at the tiller handle 90, a friction adjuster 92 is disposed in a vicinity of the throttle control grip 91. The friction adjuster 92 is an operating member to adjust the frictional resistance when operating the throttle control grip 91. By adjusting the frictional resistance by the friction adjuster 92, for example, the throttle control grip 91 can be fixed at any operation position. A shift lever 93 is disposed near a base portion of the tiller handle 90. The operation of the shift lever 93 is mechanically transmitted to the shift rod 44 (see FIG. 3). Also, a trolling output operation portion 94 may be provided on the tiller handle 90. As with the trolling output operation portion 84 of the preferred embodiments described above, the trolling output operation portion 94 preferably includes an output increasing switch 94U and an output decreasing switch 94D. That is, a trolling propulsion function may be provided by which the target engine speed can be increased/decreased in a stepwise manner by operation of the switches 94U and 94D and with the engine speed corresponding to the operation position of the throttle control grip 91 as the reference target engine speed.

In the preferred embodiments described above, the trolling output operation portion 84 or 94 to adjust the engine output during trolling is preferably used for fine adjustment of the target engine speed regardless of whether or not the reference target engine speed is the idling engine speed. However, the trolling output operation portion 84 or 94 may be used when the reference target engine speed is no more than the idling engine speed and a separate output operation unit may be provided. The separate output operation unit may be used for fine adjustment of the engine output when the reference target engine speed exceeds the idling engine speed. As with the trolling output operation portions 84 and 94, such an output operation unit also preferably includes an output increasing operating member and an output decreasing operating member.

In the preferred embodiments described above, the operation of the accelerator operation unit (remote controller 7, throttle control grip 91) preferably is mechanically transmitted to the throttle valve. However, preferred embodiments of the present invention are also applicable to an arrangement (a so-called electronic throttle) where an operation amount of an accelerator operation unit is detected by a sensor and a throttle valve is driven by an actuator based on an output signal of the sensor.

Although in the preferred embodiments described above, an outboard motor has been described as a non-limiting example, preferred embodiments of the present invention may be applied to a vessel propulsion device other than an outboard motor.

The present application corresponds to Japanese Patent Application No. 2012-150727 filed in the Japan Patent Office on Jul. 4, 2012, and the entire disclosure of the application is incorporated herein by reference.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A vessel propulsion system comprising:
an engine that provides a propulsive force to a vessel;
a throttle valve that adjusts an air amount supplied to the engine;
a throttle opening degree sensor configured to detect an opening degree of the throttle valve;
an accelerator operation unit operated by an operator to adjust the throttle opening degree of the throttle valve, the throttle opening degree corresponding to an operation amount of the accelerator operation unit;
a control unit programmed to judge whether the opening degree of the throttle valve is maintained at a fixed value based on an output signal from the throttle opening degree sensor, and when the throttle valve is maintained at the fixed value, to vary an engine output when the throttle opening degree is maintained at the fixed value other than an idling opening degree; and
an output operation unit operated by the operator to adjust the engine output when the throttle opening degree is maintained at the fixed value other than the idling opening degree; wherein
the engine output that corresponds to the operation amount of the accelerator operation unit is a reference output; and
the control unit is programmed to vary the engine output in accordance with an operation of the output operation unit.

2. The vessel propulsion system according to claim 1, wherein the output operation unit is a trolling output operation unit operated by the operator to adjust the engine output during trolling.

3. The vessel propulsion system according to claim 1, wherein the control unit is programmed to set a variation amount of the engine output from the reference output in accordance with the operation of the output operation unit.

4. The vessel propulsion system according to claim 3, wherein the output operation unit outputs commands in a plurality of steps in accordance with the operation by the operator; and
the control unit is programmed to vary the engine output with respect to the reference output by a plurality of stepped amounts in accordance with the commands output from the output operation unit.

5. The vessel propulsion system according to claim 1, wherein the output operation unit includes an output increasing operating member to increase the engine output, and the control unit is programmed to increase the engine output by a predetermined amount in response to operation of the output increasing operating member.

6. The vessel propulsion system according to claim 1, wherein the output operation unit includes an output decreasing operating member to decrease the engine output, and the control unit is programmed to decrease the engine output by a predetermined amount in response to operation of the output decreasing operating member.

7. The vessel propulsion system according to claim 1, wherein the control unit is programmed to vary an ignition timing of the engine to vary the engine output when the throttle opening degree is maintained at the fixed value other than the idling opening degree.

8. The vessel propulsion system according to claim 1, further comprising:
a bypass passage that bypasses the throttle valve to supply air to the engine; and
an idle opening degree adjustment valve disposed in the bypass passage; wherein
the control unit is programmed to vary an opening degree of the idling opening degree adjustment valve to vary the engine output when the throttle opening degree is maintained at the fixed value other than the idling opening degree.

9. The vessel propulsion system according to claim 1, wherein the control unit is programmed to set a reference target engine speed in accordance with the operation amount of the accelerator operation unit, to vary a target engine speed based on the reference target engine speed, and to control the engine so that the target engine speed is attained.

10. The vessel propulsion system according to claim 1, wherein the control unit is programmed with a plurality of control modes including an ordinary mode of controlling the engine output in accordance with the operation amount of the accelerator operation unit, and a trolling mode to vary the engine output even when the operation amount of the accelerator operation unit is maintained at a fixed value.

11. The vessel propulsion system according to claim 10, wherein the control unit is programmed to cancel the trolling mode when the operation amount of the accelerator operation unit becomes no less than a predetermined operation amount, or when the operation amount of the accelerator operation unit varies by no less than a predetermined value that corresponds to the fixed value of the throttle opening degree.

* * * * *